US010850656B2

(12) United States Patent
Garcia Salgado et al.

(10) Patent No.: US 10,850,656 B2
(45) Date of Patent: Dec. 1, 2020

(54) APPARATUS INCLUDING INDUCTIVE CHARGER AND RETRACTABLE CUP HOLDER

(71) Applicant: FORD GLOBAL TECHNOLOGIES, LLC, Dearborn, MI (US)

(72) Inventors: Luis Omar Garcia Salgado, Mexico City (MX); Leopoldo Urbina Marquez, México City (MX); Carlos Caballero De Ita, Benito Juarez (MX); Jose Alfredo Peregrina Loera, México City (MX); Eduardo Daniel Mejia Caballero, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 356 days.

(21) Appl. No.: 15/923,690

(22) Filed: Mar. 16, 2018

(65) Prior Publication Data

US 2019/0283645 A1 Sep. 19, 2019

(51) Int. Cl.

| | |
|---|---|
| ***H01M 10/46*** | (2006.01) |
| ***B60N 3/10*** | (2006.01) |
| ***B60R 16/03*** | (2006.01) |
| ***H02J 50/10*** | (2016.01) |
| ***H02J 7/00*** | (2006.01) |
| ***H02J 7/02*** | (2016.01) |

(52) U.S. Cl.
CPC .............. *B60N 3/102* (2013.01); *B60R 16/03* (2013.01); *H02J 7/0042* (2013.01); *H02J 7/025* (2013.01); *H02J 50/10* (2016.02)

(58) Field of Classification Search
CPC .......... H02J 7/0042; H02J 7/355; H02J 50/10; H02J 7/0025; H02J 7/0044; H02J 7/0045; B60N 3/102; B60N 3/106; B60N 3/108; B60N 3/18
USPC .......................................... 320/108, 114, 115
See application file for complete search history.

(56) References Cited

U.S. PATENT DOCUMENTS

| | | | | |
|---|---|---|---|---|
| 4,759,584 | A * | 7/1988 | Dykstra | B60N 3/102 108/25 |
| 6,217,112 | B1 | 4/2001 | Linsenmeier et al. | |
| 6,834,838 | B2 | 12/2004 | Dennis et al. | |
| 8,439,438 | B2 | 5/2013 | Oldani et al. | |
| 9,706,865 | B2 | 7/2017 | Shen | |

(Continued)

FOREIGN PATENT DOCUMENTS

| | | | |
|---|---|---|---|
| CN | 104960453 | A | 10/2015 |
| EP | 2979930 | A1 | 12/2005 |

(Continued)

OTHER PUBLICATIONS

English Machine Translation of CN104960453A.

(Continued)

*Primary Examiner* — Edward Tso
(74) *Attorney, Agent, or Firm* — David Coppiellie; King & Shickli, PLLC

(57) ABSTRACT

An apparatus includes a base, an inductive charger, concealed under the base for charging an electronic device wirelessly, and a retractable cup holder. The retractable cup holder is displaceable between a home position recessed and nested within the base and a deployed position overlying the base for stably supporting the side of a tall drink cup, drink bottle, can or other item.

15 Claims, 5 Drawing Sheets

(56) References Cited

U.S. PATENT DOCUMENTS

| | | | | |
|---|---|---|---|---|
| 2005/0224675 | A1 | 10/2005 | Schaal | |
| 2005/0269471 | A1 | 12/2005 | Wagner | |
| 2007/0075153 | A1* | 4/2007 | Blanchard | H02J 5/005 237/12.3 A |
| 2008/0079388 | A1* | 4/2008 | Sarnowsky | H02J 7/025 320/103 |
| 2011/0062916 | A1* | 3/2011 | Farahani | H01Q 3/12 320/108 |
| 2013/0264339 | A1* | 10/2013 | Oldani | B60N 3/102 220/8 |
| 2015/0270738 | A1* | 9/2015 | Colja | H02J 50/10 307/104 |
| 2016/0272098 | A1* | 9/2016 | Barnes | B60N 3/102 |
| 2017/0201115 | A1* | 7/2017 | Stickley | H04M 19/00 |
| 2018/0029514 | A1* | 2/2018 | Salinas | B60N 3/105 |

FOREIGN PATENT DOCUMENTS

| | | | |
|---|---|---|---|
| GB | 2529760 | A | 3/2016 |
| JP | 2012025184 | A | 2/2012 |
| KR | 2015072108 | A | 6/2005 |
| KR | 100774402 | B1 | 11/2007 |
| KR | 1409225 | B1 | 6/2014 |
| KR | 2014091266 | A | 7/2014 |
| KR | 2015032080 | A | 3/2015 |
| KR | 2015072137 | A | 6/2015 |
| KR | 1665247 | B1 | 10/2016 |
| KR | 2016129511 | A | 11/2016 |
| KR | 2017028137 | A | 3/2017 |
| KR | 20170037040 | A | 4/2017 |
| KR | 1737232 | B1 | 5/2017 |

OTHER PUBLICATIONS

English Machine Translation of JP2012025184A.
English Machine Translation of KR100774402B1.
English Machine Translation of KR1409225B1.
English Machine Translation of KR1665247B1.
English Machine Translation of KR1737232B1.
English Machine Translation of KR2014091266A1.
English Machine Translation of KR2015032080A.
English Machine Translation of KR2015072108A.
English Machine Translation of KR2015072137A.
English Machine Translation of KR2016129511A.
English Machine Translation of KR20170037040A.
English Machine Translation of KR2017028137A.

* cited by examiner 10
20
30
16
36
12
48
14
44
C
32
40
38
42
46
34
28
16

APPARATUS INCLUDING INDUCTIVE CHARGER AND RETRACTABLE CUP HOLDER

TECHNICAL FIELD

This document relates generally to the motor vehicle equipment field and, more particularly, to a new and improved apparatus including an inductive charger, for charging electronic devices wirelessly, and a retractable cup holder displaceable between a home position and a deployed position for holding cups, bottles and the like.

BACKGROUND

Occupants of motor vehicles often travel with tall drink cups, cans or containers and various electronic devices such as cell phones and navigation devices.

This document relates to a new and improved apparatus that incorporates an inductive charger for charging electronic devices commonly carried by motor vehicle occupants as well as a retractable cup holder that is displaceable between a storage or home position and a deployed position for holding tall cups, cans, bottles and the like. Advantageously, the apparatus provides significant functionality and versatility for various applications while occupying a minimal amount of room on a center console and displaying an aesthetically pleasing appearance.

SUMMARY

In accordance with the purposes and benefits described herein a new and improved apparatus is provided. That apparatus comprises a base, an inductive charger carried on the base and a retractable cup holder displaceable between a home position and a deployed position.

The retractable cup holder may include an actuator to displace the retractable cup holder between the home position and the deployed position. That actuator may comprise a drive motor and a drive gear. In addition, a cooperating drive rack may be provided on the retractable cup holder. The drive gear engages the drive rack in order to displace the retractable cup holder as desired by the user.

More specifically, the retractable cup holder may include a first retaining ring. Further, the retractable cup holder may include a first support stanchion. Further, the retractable cup holder may include a second support stanchion.

In addition, the retractable cup holder may include a second retaining ring. In such an embodiment, the retractable cup holder may include a bridge extending between the first retaining ring and the second retaining ring. The drive rack may depend or extend from the bridge.

The base may include a support surface. Further, the base may include a first receiver. The drive rack may pass through the first receiver to the actuator, positioned below the base, where it is concealed from view.

The base may include a second receiver. The first retaining ring may be held in the second receiver when the retractable cup holder is in the home position.

Still further, the base may include a third receiver. The second retaining ring may be held in the third receiver when the retractable cup holder is in the home position.

Still further, the base may include a fourth receiver. The first support stanchion may pass through the fourth receiver. Still further, the base may include a fifth receiver. The second support stanchion may pass through the fifth receiver.

The inductive charger may be concealed from view under the base. The inductive charger may include a first transmitter coil located inside the second receiver. In one or more embodiments, the inductive charger may include a second transmitter coil located inside the second receiver.

The apparatus may also include a decorative trim piece or housing margin extending around the support surface of the base. That support surface may be recessed with respect to the housing margin. That recessed support surface may be sized and shaped to receive and hold an electronic device such as a cell phone in a charging position on the support surface overlying the inductive charger when the retractable cup holder is retracted or displaced into the home position.

In the following description, there are shown and described several preferred embodiments of the apparatus. As it should be realized, the apparatus is capable of other, different embodiments and its several details are capable of modification in various, obvious aspects all without departing from the apparatus set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

Reference will now be made in detail to the present preferred embodiments of the apparatus, examples of which are illustrated in the accompanying drawing figures.

DETAILED DESCRIPTION

Figure 1:
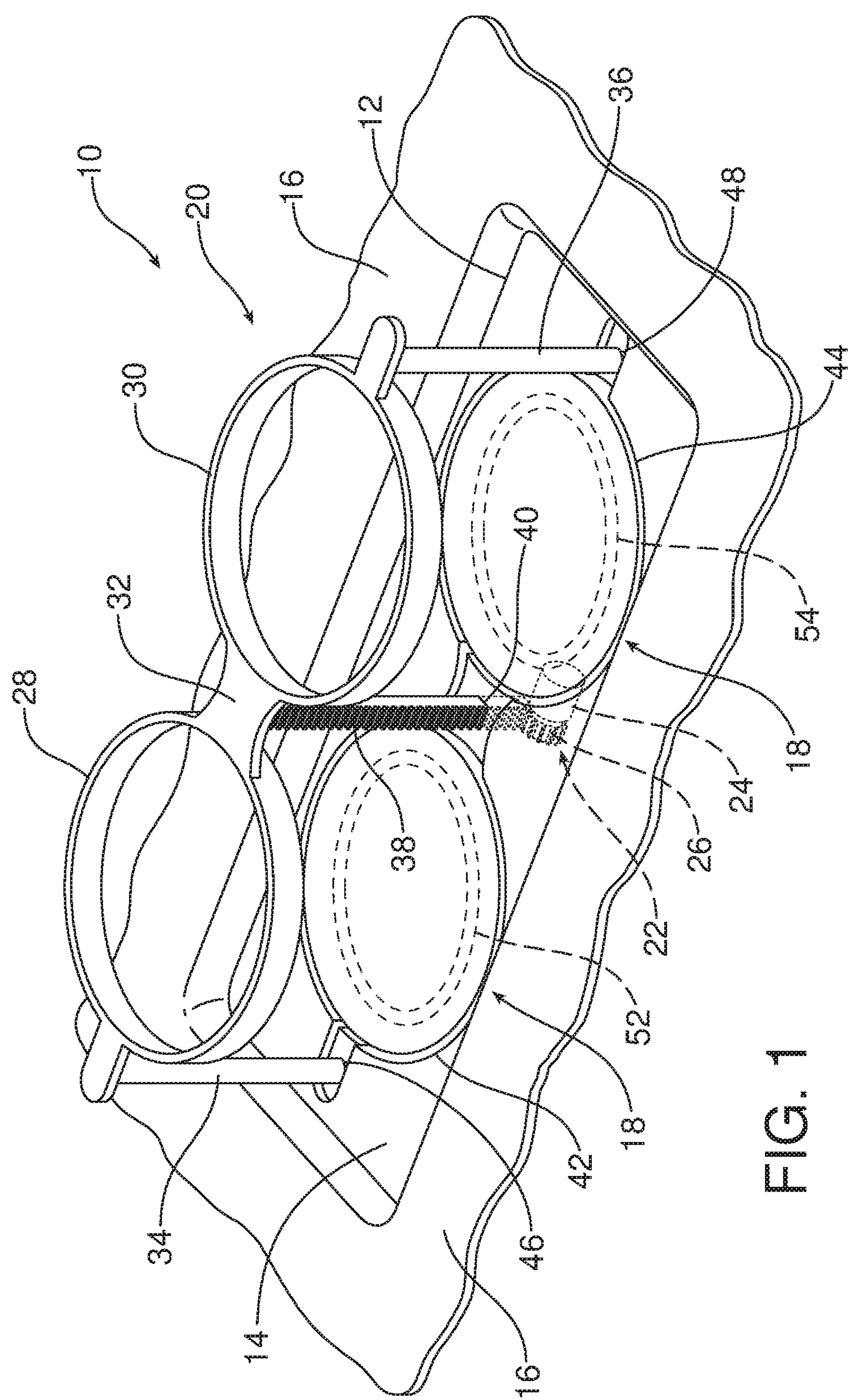
FIG. 1 is a detailed perspective view of the apparatus illustrating the retractable cup holder in the raised or deployed position.
Figure 2:
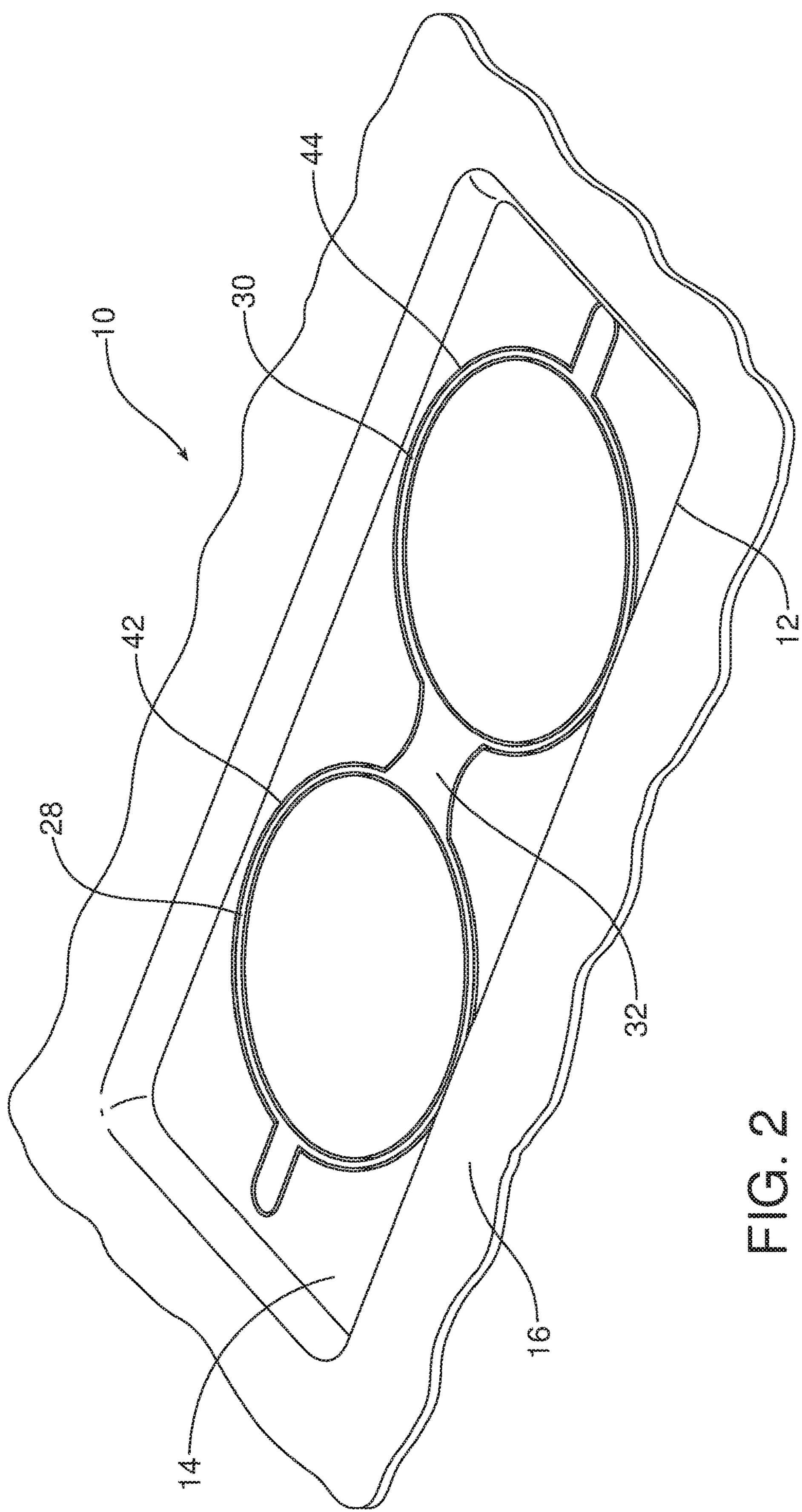
FIG. 2 is a similar perspective view but illustrating the apparatus with the retractable cup holder in the retracted or home position.
Figure 3:
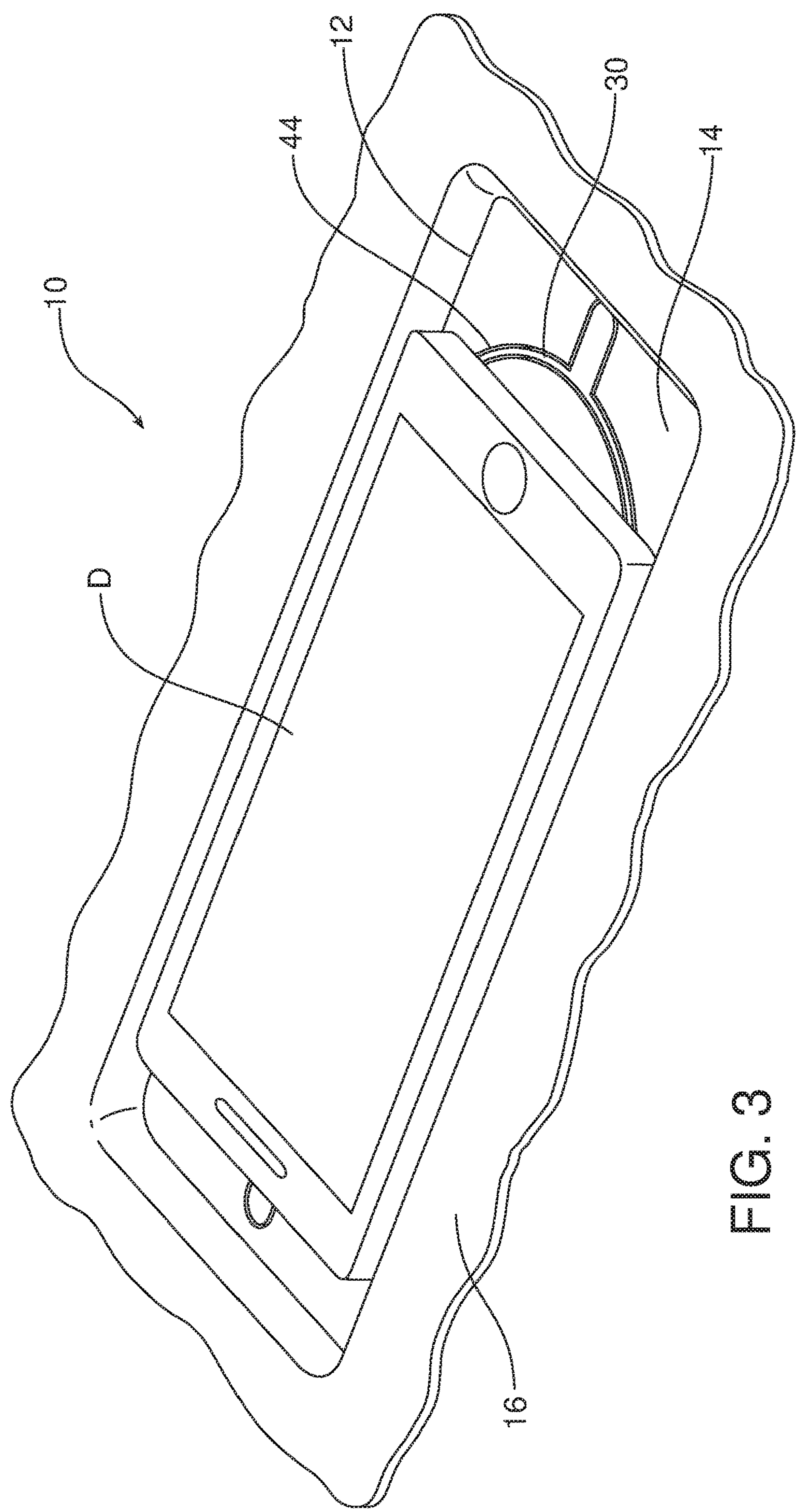
FIG. 3 is a detailed perspective view illustrating an electronic device in the form of a cell phone, held in position on the recessed support surface by the surrounding housing margin in a position to allow for inductive charging of the apparatus by the inductive charger concealed beneath the base.
Figure 4:
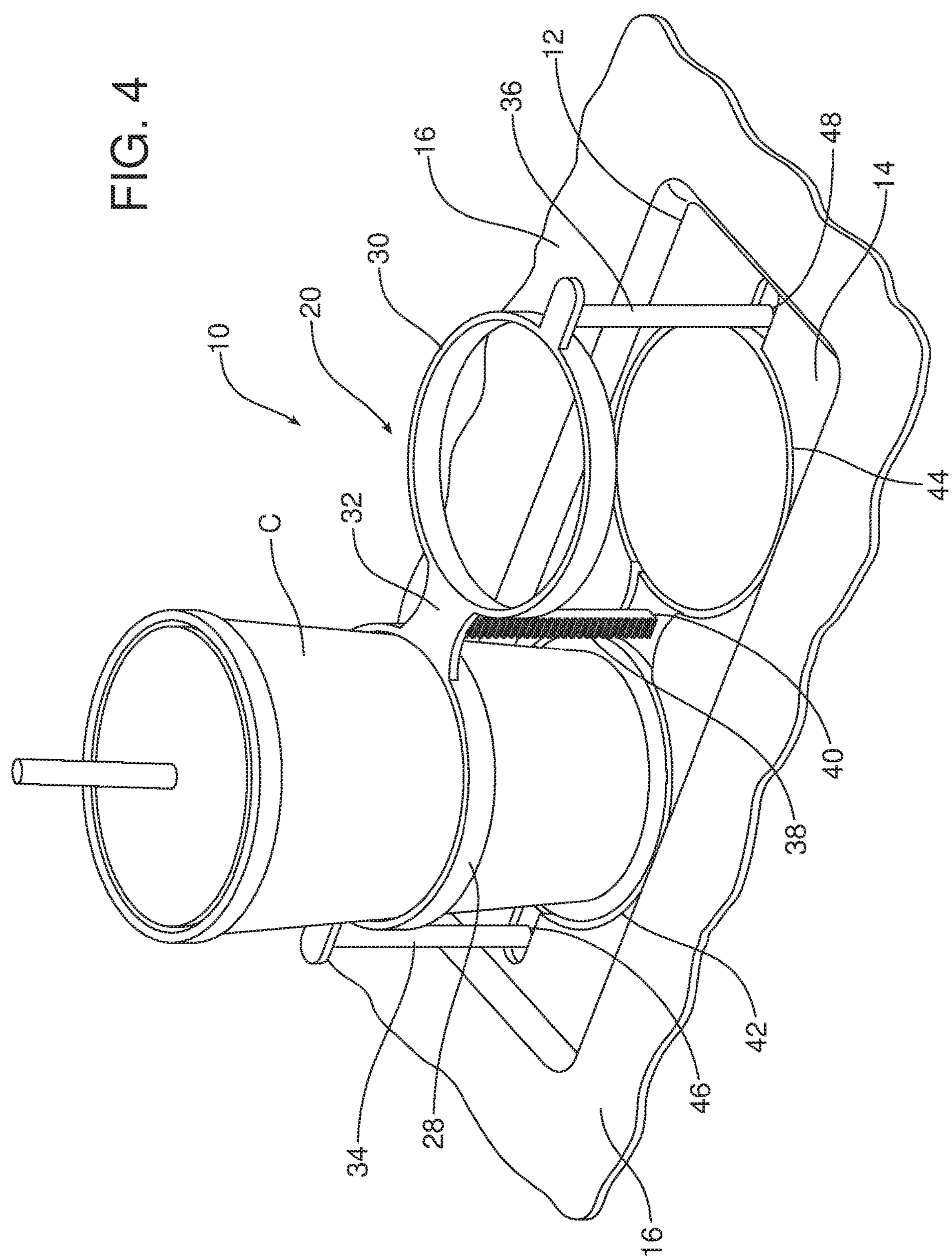
FIG. 4 is a perspective view illustrating a cup held in the first retaining ring formed by the retractable cup holder shown in the deployed position.

Reference is now made to FIGS. 1-4 illustrating the new and improved apparatus 10 which is adapted to (a) hold a drink cup C or a bottle, can or other tall item as illustrated in FIG. 4 or (b) charge an electronic device D such as the cell phone, illustrated in FIG. 3 by means of a wireless charging feature described in greater detail below.

As illustrated best in drawing FIGS. 1 and 2, the apparatus 10 includes a base 12. The base 12 includes a support surface 14. A trim panel or housing margin 16 extends around the support surface 14. The support surface 14 is recessed with respect to the housing margin 16 so as to function as a tray for holding an electronic device D on the support surface 14 within the housing margin 16 as illustrated in FIG. 3.

As illustrated in FIGS. 1 and 2, the apparatus 10 also includes an inductive charger 18 that is concealed from view under the base 12. Such an inductive charger 18 is of a type known in the art to function as a charger for the power supply or batteries of an overlying electronic device D such as illustrated in Figure D.

The apparatus 10 also includes a retractable cup holder, generally designated by reference numeral 20. The retractable cup holder 20 is displaceable between a retracted or home position illustrated in FIG. 2 and an extended, raised or deployed position illustrated in FIG. 1 and FIG. 4.

More specifically, the retractable cup holder 20 further includes an actuator 22 to displace the retractable cup holder between the home and deployed positions. In the illustrated embodiment, the actuator 22 comprises a drive motor 24 and a drive gear 26. See FIG. 5.

In the illustrated embodiment, the retractable cup holder includes a first retaining ring 28, a second retaining ring 30 and a bridge 32 between and connecting the first retaining ring and the second retaining ring. The first retaining ring 28 and the second retaining ring 30 are both adapted to receive and support a cup C, a can, a bottle or other tall item as illustrated in FIG. 4. In the illustrated embodiment, the first retaining ring 28 is the same size or diameter as the second retaining ring 30. In other embodiments the rings 28, 30 may be of different size. Further, fewer or more retaining rings may be provided, depending on the desired application.

Figure 5:
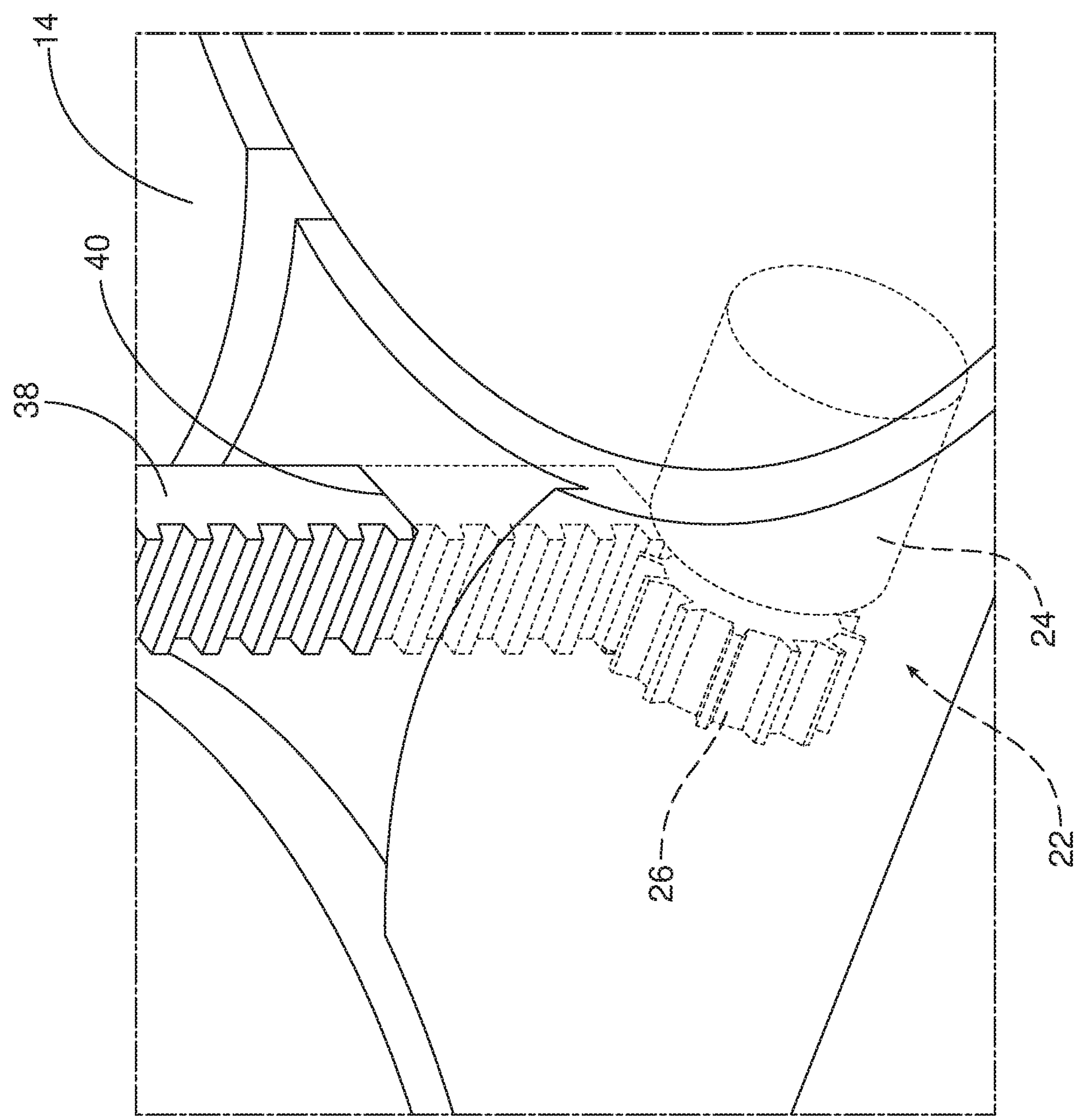
FIG. 5 is a detailed perspective view of the actuator that displaces the retractable cup holder between the raised or deployed position illustrated in FIGS. 1 and 4 and the retracted or home position illustrated in FIG. 2.

A first support stanchion 34 depends from the first retaining ring 28. A second support stanchion 36 extends or depends from the second retaining ring 30. A drive rack 38 depends from the bridge 32. As shown in FIG. 5, the drive rack 38 meshes with the drive gear 26 in a manner that allows the drive motor 24 to displace the retractable cup holder 20 between the retracted or home position illustrated in FIG. 2 and the raised or deployed position illustrated in FIGS. 1 and 4.

As best illustrated in FIG. 1, the base 12 includes a first receiver 40, a second receiver 42, a third receiver 44, a fourth receiver 46 and a fifth receiver 48. The drive rack 38 passes through the first receiver 40 or opening in order to engage with the drive gear 26. Here it should be noted that the drive gear 26 and drive motor 24 of the actuator 22 are located beneath the support surface 14 of the base 12 where they are concealed from view and protected somewhat from dirt and debris.

The first retaining ring 28 is held in or nests in the second receiver 42 or channel when the retractable cup holder 20 is in the home position illustrated in FIG. 2. Similarly, the second retaining ring 30 is held in or nested in the third receiver 44 or channel when the retractable cup holder is in the home position as illustrated in FIG. 2.

The first support stanchion 34 slides through the fourth receiver 46 or opening as the retractable cup holder 20 is displaced between the home and deployed positions. Similarly, the second support stanchion 36 slides through the fifth receiver 48 or aperture as the retractable cup holder 20 is displaced between the home and deployed positions.

When the retractable cup holder 20 is in the fully deployed position illustrated in FIGS. 1 and 4, it should be appreciated that the distal end of the first support stanchion 34 and the distal end of the second support stanchion 36 are received and engaged in the respective fourth and fifth receivers 46, 48 of the base 12. The engagement of the drive rack 38 by the drive gear 26 and the first and second support stanchions 34, 36 with the fourth and fifth receivers 46, 48, respectively, function together to stably support the retractable cup holder 20 when the retractable cup holder is in the raised or deployed position illustrated in FIGS. 1 and 4. This allows the retractable cup holder 20 to support a cup C (see FIG. 4) in a manner that prevents the cup from tipping over when subjected to acceleration, deceleration and lateral cornering forces that might be produced during normal driving of a motor vehicle.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the inductive charger 18 includes a first transmitter coil 52 located inside the area inscribed by the second receiver 42. Further, the inductive charger 18 includes a second transmitter coil 54 located inside the area inscribed by the third receiver 44. Here it should be appreciated that the inductive charger 18 may assume an alternative design such as a single coil if desired. All such modifications and variations are within the scope of the appended claims when interpreted in accordance with the breadth to which they are fairly, legally and equitably entitled.

What is claimed:

1. An apparatus, comprising:

a base;

an inductive charger concealed under said base;

a retractable cup holder displaceable between a home position and a deployed position, said retractable cup holder including a first retaining ring and a first support stanchion;

a drive rack on said retractable cup holder; and an actuator to displace said retractable cup holder, wherein said actuator comprises a drive motor and a drive gear, said drive rack in engagement with said drive gear.

2. The apparatus of claim 1, wherein said retractable cup holder includes a second support stanchion.

3. The apparatus of claim 2, wherein said retractable cup holder includes a second retaining ring.

4. The apparatus of claim 3, wherein said retractable cup holder includes a bridge between said first retaining ring and said second retaining ring.

5. The apparatus of claim 4, wherein said drive rack extends from said bridge.

6. The apparatus of claim 5, wherein said base includes a support surface.

7. The apparatus of claim 6, wherein said base includes a first receiver, said drive rack passing through said first receiver.

8. The apparatus of claim 7, wherein said base includes a second receiver, said first retaining ring being held in said second receiver when said retractable cup holder is in said home position.

9. The apparatus of claim 8, wherein said base includes a third receiver, said second retaining ring being held in said third receiver when said retractable cup holder is in said home position.

10. The apparatus of claim 9, wherein said base includes a fourth receiver, said first support stanchion passing through said fourth receiver.

11. The apparatus of claim 10, wherein said base includes a fifth receiver, said second support stanchion passing through said fifth receiver.

12. The apparatus of claim 11, wherein said inductive charger includes a first transmitter coil located inside said second receiver.

13. The apparatus of claim 12, wherein said inductive charger includes a second transmitter coil located inside said third receiver.

14. The apparatus of claim 13, further including a housing margin extending around said support surface.

15. The apparatus of claim 14, wherein said support surface is recessed with respect to said housing margin.

* * * * *